(12) United States Patent
Pike et al.

(10) Patent No.: US 8,070,179 B2
(45) Date of Patent: Dec. 6, 2011

(54) STORAGE LATCH FOR FOLDABLE STROLLER

(75) Inventors: Robert T. Pike, Reading, PA (US); Michael A. Dotsey, Pottstown, PA (US)

(73) Assignee: Graco Children's Products Inc., Atlanta, GA (US)

( * ) Notice: Subject to any disclaimer, the term of this patent is extended or adjusted under 35 U.S.C. 154(b) by 776 days.

(21) Appl. No.: 11/852,920

(22) Filed: Sep. 10, 2007

(65) Prior Publication Data
US 2008/0073877 A1  Mar. 27, 2008

Related U.S. Application Data

(60) Provisional application No. 60/843,482, filed on Sep. 9, 2006.

(51) Int. Cl.
B62B 3/02 (2006.01)
(52) U.S. Cl. .......................................... 280/642
(58) Field of Classification Search .......... 280/642, 280/647, 648, 650, 657, 658; 297/17, 16.1
See application file for complete search history.

(56) References Cited

U.S. PATENT DOCUMENTS

| | | | | |
|---|---|---|---|---|
| 2,305,719 | A * | 12/1942 | Lee | 280/7.1 |
| 2,545,336 | A * | 3/1951 | Binder | 280/650 |
| 3,679,223 | A * | 7/1972 | Sakal | 280/37 |
| 5,842,713 | A * | 12/1998 | Barnes et al. | 280/642 |
| 6,273,451 | B1 | 8/2001 | Julien et al. | |
| 6,296,268 | B1 * | 10/2001 | Ford et al. | 280/648 |
| 6,382,652 | B1 * | 5/2002 | Cheng | 280/293 |
| 6,877,761 | B2 * | 4/2005 | Hsia | 280/642 |
| 2001/0045720 | A1 * | 11/2001 | Schlicht | 280/166 |
| 2005/0212266 | A1 | 9/2005 | Lu | |

FOREIGN PATENT DOCUMENTS

| | | |
|---|---|---|
| AT | 414231 | 10/2006 |
| EP | 1 295 776 | 3/2003 |
| GB | 256 391 | 8/1926 |

OTHER PUBLICATIONS

International Search Report and Written Opinion issued in related International application No. PCT/US2007/078042 mailed Dec. 14, 2007.
International Preliminary Report on Patentability issued in related International application No. PCT/US2007/078042 mailed Sep. 3, 2008.
"Owner's Manual", Graco DuoGlider stroller, pp. 1 and 9; Aug. 2005.

* cited by examiner

*Primary Examiner* — Frank Vanaman
(74) *Attorney, Agent, or Firm* — Lempia Summerfield Katz LLC

(57) ABSTRACT

A foldable stroller has a frame assembly that can be moved from an in-use configuration to a folded configuration. A storage latch for the foldable stroller has a catch part carried on a first frame part that extends transversely between left and right frame sides. The storage latch also has a latch part carried on a second frame part that extends transversely between the left and right frame sides, at least one of the latch or catch parts moving from a stowed position to a latching position adjacent the other of the parts as the frame assembly is moved to the folded configuration.

18 Claims, 8 Drawing Sheets

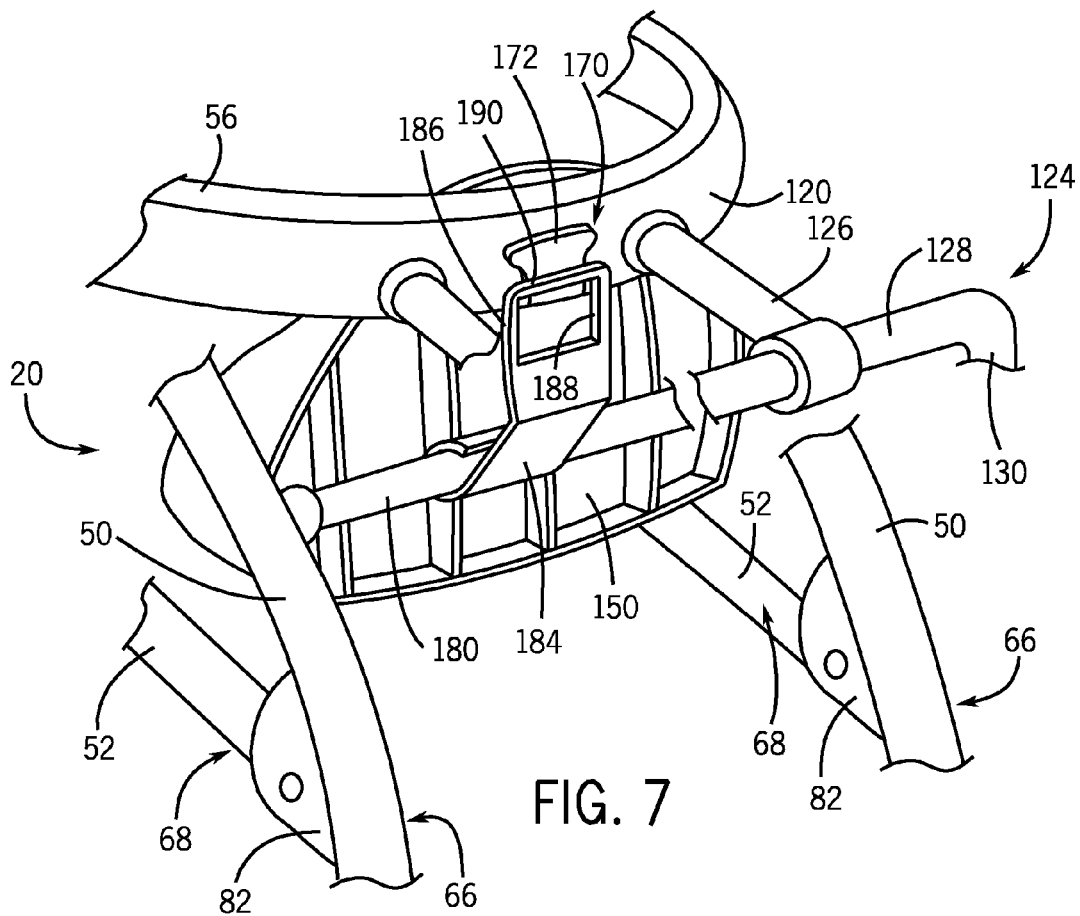
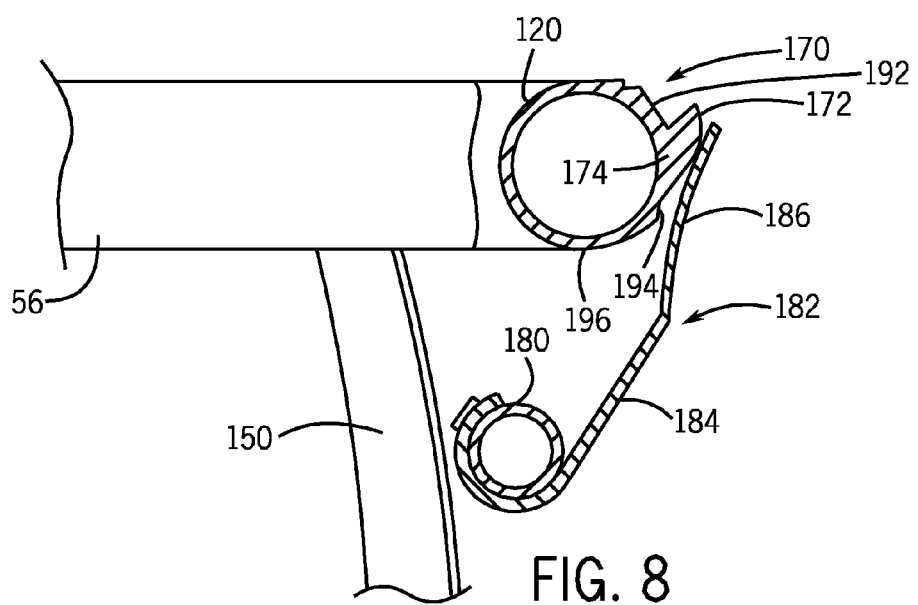

US 8,070,179 B2

STORAGE LATCH FOR FOLDABLE STROLLER

RELATED APPLICATION DATA

This patent is related to and claims priority benefit of U.S. provisional patent application Ser. No. 60/843,482, entitled "Storage Latch for Foldable Stroller," which was filed on Sep. 9, 2006, and the entire contents of which are incorporated herein by reference.

BACKGROUND OF THE INVENTION

1. Field of the Disclosure

The present disclosure is generally directed to strollers, and more particularly to a centrally mounted storage latch that can automatically catch when the stroller is folded for storage to retain the stroller in the folded configuration.

2. Description of Related Art

Strollers are known that collapse from an in-use position to a collapsed or folded configuration. Strollers are also known to have latches that hold or retain the stroller in the folded configuration for storage. Typically, the storage latch on such a stroller is mounted on an outer left or right side frame part of the stroller frame, and only on one side of the stroller. The latch can be accessed readily when it is desired to release the stroller from the folded and latched condition. However, one disadvantage with this type of latch, being on the side of the stroller, is that the device can visibly detract from the aesthetic appearance of the product. Most stroller manufacturers provide a storage latch that is mounted in line with or outside of the lengthwise or longitudinal frame tubes on the stroller frame. Such a latch may automatically catch when the stroller is folded. However, many of these types of frame side latches must be manually pivoted to the latching or catch position.

In one typical example, a known side latch is on one side frame part and operates to automatically catch another component on a mating side frame part when the stroller frame is moved to the folded configuration. This type of side latch is often in the form of a cantilevered lever that has a snap detail at the terminal or distal end. When the stroller is folded, the snap detail cams over and catches on a post or stud on the mating side frame part to latch the two folded or collapsed frame parts together. To release the latch, the user must bend the resilient lever to release it from the post or stud. Another disadvantage with this type of latch is that the lever is often difficult to manipulate and bend.

Additionally, with this type of latch typically provided only on one side of the stroller frame, asymmetrical torque can be applied to the frame structure during movement and transport of the folded stroller and just prior to release of the latch. This is disadvantageous in that the resulting asymmetry can cause undue wear on the joints of the stroller frame over time.

BRIEF DESCRIPTION OF THE DRAWINGS

Objects, features, and advantages of the present invention will become apparent upon reading the following description in conjunction with the drawing figures, in which:

FIG. 7 is a top perspective view of the stroller latch in a nearly latched position.

FIG. 8 is a cross section taken along line VIII-VIII of the latch in the position shown in FIG. 7.

DETAILED DESCRIPTION OF THE DISCLOSURE

Figure 1:
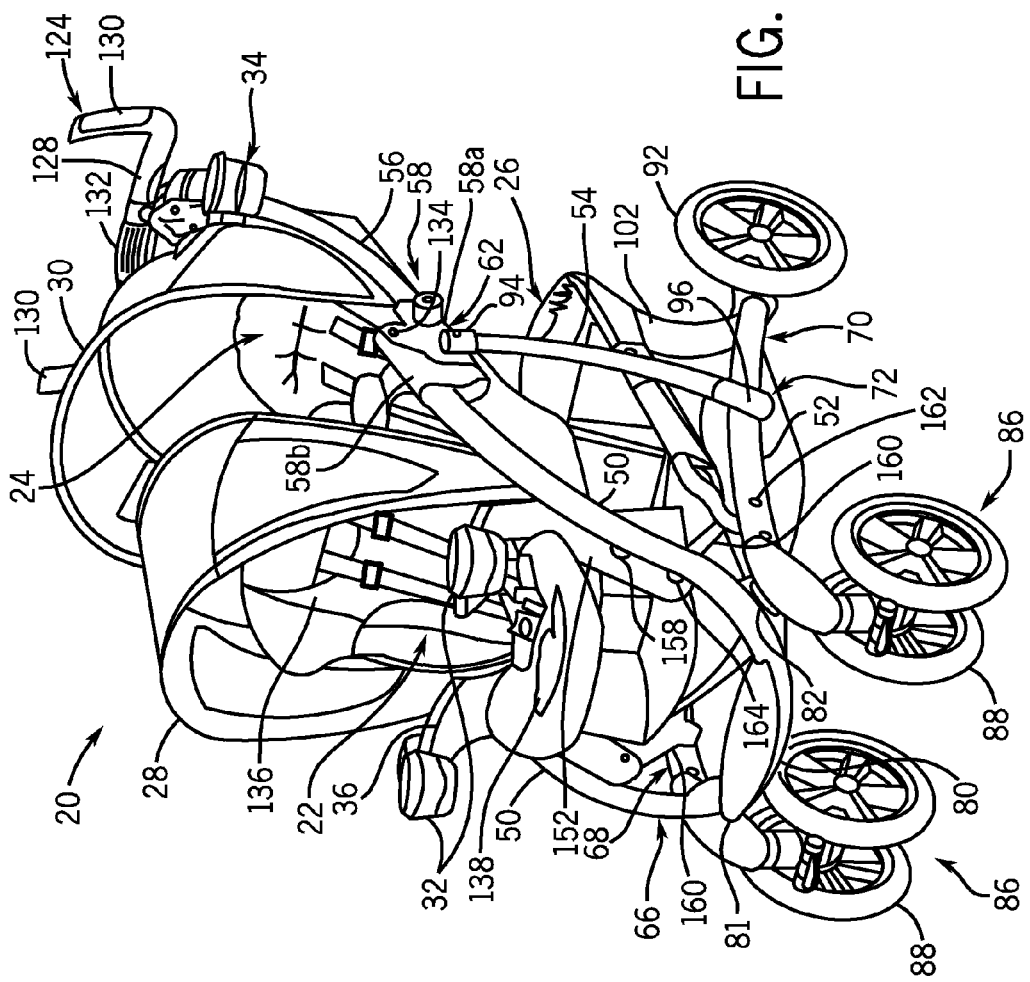
FIG. 1 is a perspective view of one example of a double occupant (dual seat) foldable stroller that can utilize a latch constructed according to the teachings of the present invention to hold the stroller in its folded condition.

The present invention is for a storage latch on a foldable stroller. The disclosed storage latch and modifications thereto that fall within the scope of the invention address the uniquely challenging issues with stroller storage latches. The storage latch solves or improves upon one or more of the above-noted problems and other disadvantages of known foldable strollers. The primary part of the disclosed storage latch is hidden from view beneath the seat pan when the stroller is in the in-use configuration. The other part blends in with other stroller components. The primary latch part moves with movement of the seat pan as the stroller is folded to a collapsed or folded configuration. The disclosed latch is not on either side of the frame assembly, but is instead positioned on a left-to-right transverse frame part extending between the frame sides. In one example, the storage latch is mounted centrally on such parts. The disclosed latch is not unsightly or obtrusive relative to the stroller's appearance or function while the stroller is in use and can be configured and positioned so as to minimize undue stress on the frame structure when folded and latched. The disclosed storage latch components are accessible, are functionally and aesthetically unobtrusive, can reduce undue stress on the frame assembly, and are mounted between the frame sides where many stroller components, soft goods, accessories, and other parts and product features are located, and yet the storage latch still functions effectively and as intended.

Turning now to the drawings, FIGS. 1-5 shows one example of a foldable stroller 20 that can incorporate a storage latch constructed in accordance with the teachings of the present invention. The stroller 20 generally has a wheeled foldable frame that supports one or more child seats above the ground. In this example, a two seat stroller is illustrated and has a front seat 22 and a rear seat 24. However, the stroller 20 can include more or fewer seats as desired, and can be a single occupant stroller or a triple occupant stroller for example. The frame components of the stroller 20 can be made of tubular aluminum, steel, or other materials that afford sufficient strength and rigidity. A basket 26 can also be supported on the frame, such as below the seats 22 and 24. Stroller options such as child seat canopies 28 and 30, child cup holders 32, parent cup holders 34, seat arm rests 36, and the like can also be provided on the stroller 20. The stroller soft goods that cover the seats and create other stroller functions and ornamentation can also be varied from that shown within the scope of the invention.

The frame of the stroller 20 includes a left and a right frame side positioned on opposite sides of the seats 22 and 24 as is known in the art. In this example, each frame side generally has a front leg 50, a bottom rail or rear leg 52, a side support strut 54, and a push arm 56. Each frame side also has a fold latch or joint 58 that pivotally links an upper end 60 of the respective front leg 50 to a top end 62 of the respective support strut 54 and to a lower end 64 of the corresponding push arm 56. In the disclose example, the front legs 50 have bottom ends 66 pivotally coupled to forward ends 68 at the pivot points 84 of the corresponding bottom rails 52. In this example, the bottom rails 52 extend generally rearward and terminate at rear ends 70. The front legs 50 extend upward and rearward from the forward ends 68 of the bottom rails toward a back of the stroller 20.

Each support strut 54 has a strut bottom 72 that is pivotally coupled at a pivot point 96 to one of the bottom rails 52 generally at a mid-region between the forward and rear ends 68 and 70. Each strut 54 extends generally upward from the bottom rail 52. In this example, the struts 54 are angled slightly rearward from the bottom 72 to the top 62 and are curved or convex rearward. The bottom rails 52 in this example are curved upward between the forward and rear ends 68 and 70. The front legs 50 are curved upward between the bottom ends 66 and upper ends 60 as well.

The front legs 50 are connected at their bottom ends 66 by a curved or upturned cross-tube 80. The cross-tube 80 can be integrally bent as a part of the front legs 50 or can be rigidly connected by welding, fasteners, or the like to the front legs 50. A footrest 81 for an occupant of the front seat 22 is attached to and partly covers the cross-tube 80 in this example. A bracket 82 is riveted or otherwise connected near the bottom end 66 of each front leg 50 to provide hinge or pivot points 84 for the respective forward end 68 of the bottom rails 52. A front wheel assembly 86 is mounted to the frame near the pivot points 84 on each side of the stroller. In this example, each wheel assembly 86 is mounted depending from the forward end 68 of one of the bottom rails 52. Each assembly includes a pair of front wheels 88 mounted for rotation on a common axle.

Figure 4:
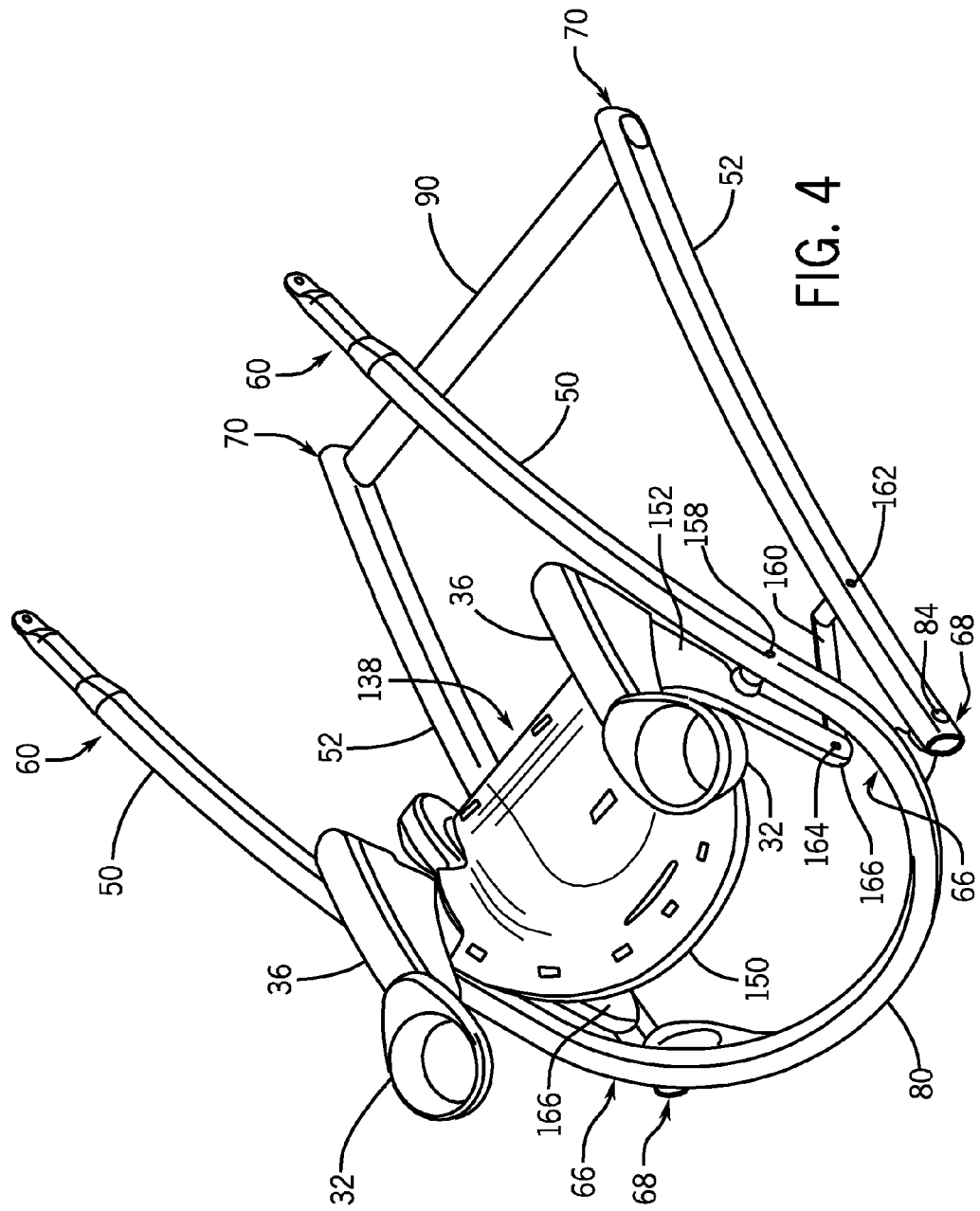
FIG. 4 is a top and front perspective view of a front portion of the stroller frame and front seat pan of the stroller in FIG. 1.

The rear legs or bottom rails 52 in this example are rigidly interconnected at their rear ends 70, e.g., by welding, fastening, or the like, by a rear crossbar 90 (see FIG. 4). The crossbar 90 can serve as an axle support for mounting a rear wheel 92 to each side of the stroller 20. The rear legs or bottom rails 52 in this example are disposed at a shallow angle to the horizontal, with the rear ends 70 being at a slightly lower elevation relative to the forward ends 68. In this example, the front legs 50 and rear legs or bottom rails 52 are about the same length and have a similar curvature. This can assist in the frame folding compactly with the legs 50 and rails 52 folding closely onto one another. However, the legs 50 and rails 52 could also have a different curvature in comparison to one another, can be straight, or the like. Additionally, the brackets 82 and pivot points 84 are situated such that the front legs 50 are vertically in line with the rear legs or bottom rails 52. Alternatively the legs and rails could be configured and pivotally connected so that the front legs and bottom rails are positioned laterally spaced apart or side-by-side, rather than vertically in line, to create a different fold configuration.

In the disclosed example, each support strut 54 is a tubular structure that is pivotally connected via a rivet, pin, or the like at its top end 62 to a lower part 58a of fold latch 58, at a pivot point 94. The lower end 72 of each support strut 54 can be pivotally connected via a rivet, pin, or the like at another pivot point 96 directly to its respective rear leg or bottom rail 52. Alternatively, a compliant suspension device (not shown) can be interposed at this location to dampen or isolate bumps and shocks during use to soften the ride over rough terrain. Irrespective of whether a suspension is used, the location of the pivotal connection point 96 on the bottom rails 52 can be chosen such that the frame components fold together compactly. Thus, the support struts 54, instead of being pivoted to the outboard sides of the bottom rails 52 and front legs 50 as depicted in the figures, instead could be pivoted either to the inboard sides of these components or via connection brackets lying in the same lateral plane as these components.

A U-shaped basket frame 100 of the basket 26 supports a fabric or mesh material 102 that creates the basket beneath the seats 22, 24. Front or free ends 104 of the basket frame 100 are pivotally attached to the rear legs or bottom rails 52 at pivotal connection points 162. Each side of the basket frame 100 rests on a protrusion (not shown) on the inboard sides of the struts 54. When the stroller 20 is folded, the protrusions move downwardly with the support struts 54, which cause the basket frame 100 and the basket 26 to drop and nest between the front and rear leg assemblies.

Figure 5:
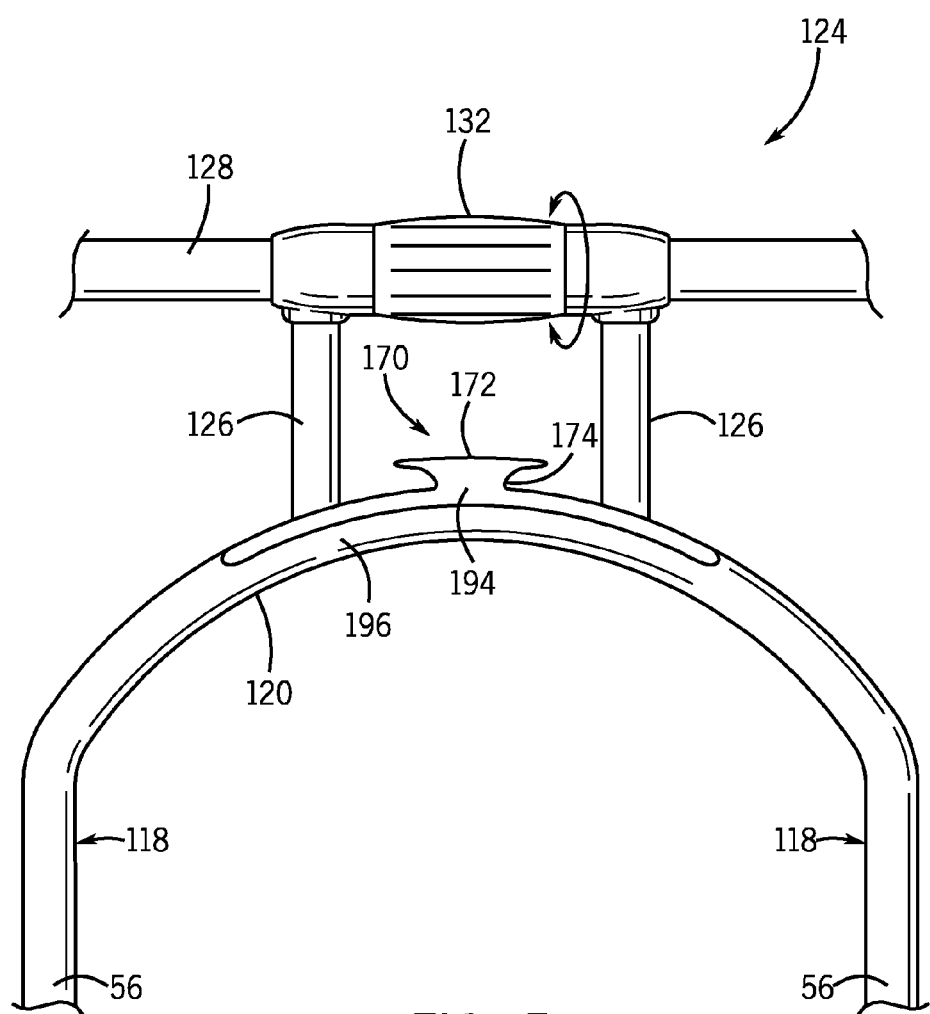
FIG. 5 is a plan view of part of the push bars and handle of the stroller in FIG. 1.

An upper crossbar 120 (see FIG. 5) interconnects the push arms 56 at their upper ends 118. In this example, the push arms 56 and crossbar 120 can be formed as an integrally bent U-shaped hollow tube. As with the front legs 50 and the lower cross-tube 80, the push arms 56 can be welded, fastened, or otherwise connected as separate components to the upper crossbar 120. In this example, lower free ends 64 of the two push arms 56 are anchored to the lower part 58a a respective fold latch 58. In this example, the push arms 56 can also be about the same length as the front legs 50 and the rear legs or bottom rails 52 so that they fold compactly onto or relative to each other. FIGS. 1 and 5 depict a handle assembly 124 connected to the crossbar 120. The handle assembly 124 includes a pair of stanchions 126 laterally spaced apart relative to one another and extending rearward and upward from the crossbar 120. A handlebar 128 extends between and is connected to the free ends of the stanchions 126. A pair of handle grips 130 are coupled to the distal ends of the handlebar 128 and project upward in this example. A user can manipulate and push the stroller 20 utilizing either the handlebar 128 or the grips 130.

A fold release mechanism or actuator 132 is provided at a midpoint on the handlebar 128. Concealed actuating cables (not shown) extend from each of the latches 58 through the push arms 56, the stanchions 126, and the handle bar 128 to the mechanism 132. Latch release (for folding) is accomplished by twisting the actuator 132 about the handle bar 128, which pulls the cables to release the latches, as described below. Details of suitable cable-operated, one-hand release mechanisms are disclosed, for example, in commonly owned U.S. Pat. No. 6,068,284, and pending application Ser. No. 11/688,847, which was filed on Mar. 20, 2007, each of which is incorporated herein by reference in the entirety.

Figure 2:
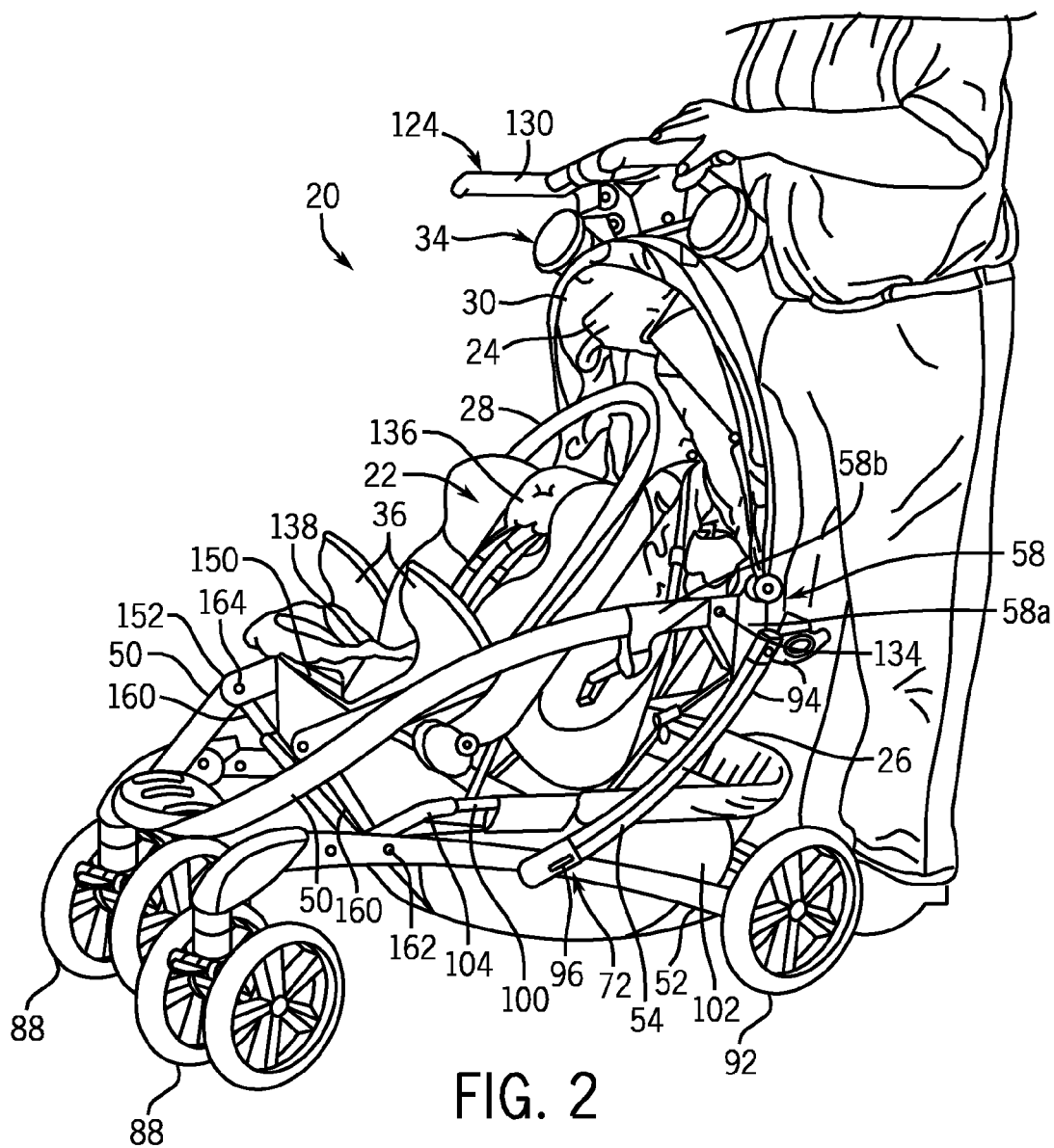
FIG. 2 is a perspective view of the stroller in FIG. 1 and shown in a partly folded configuration.
Figure 3:
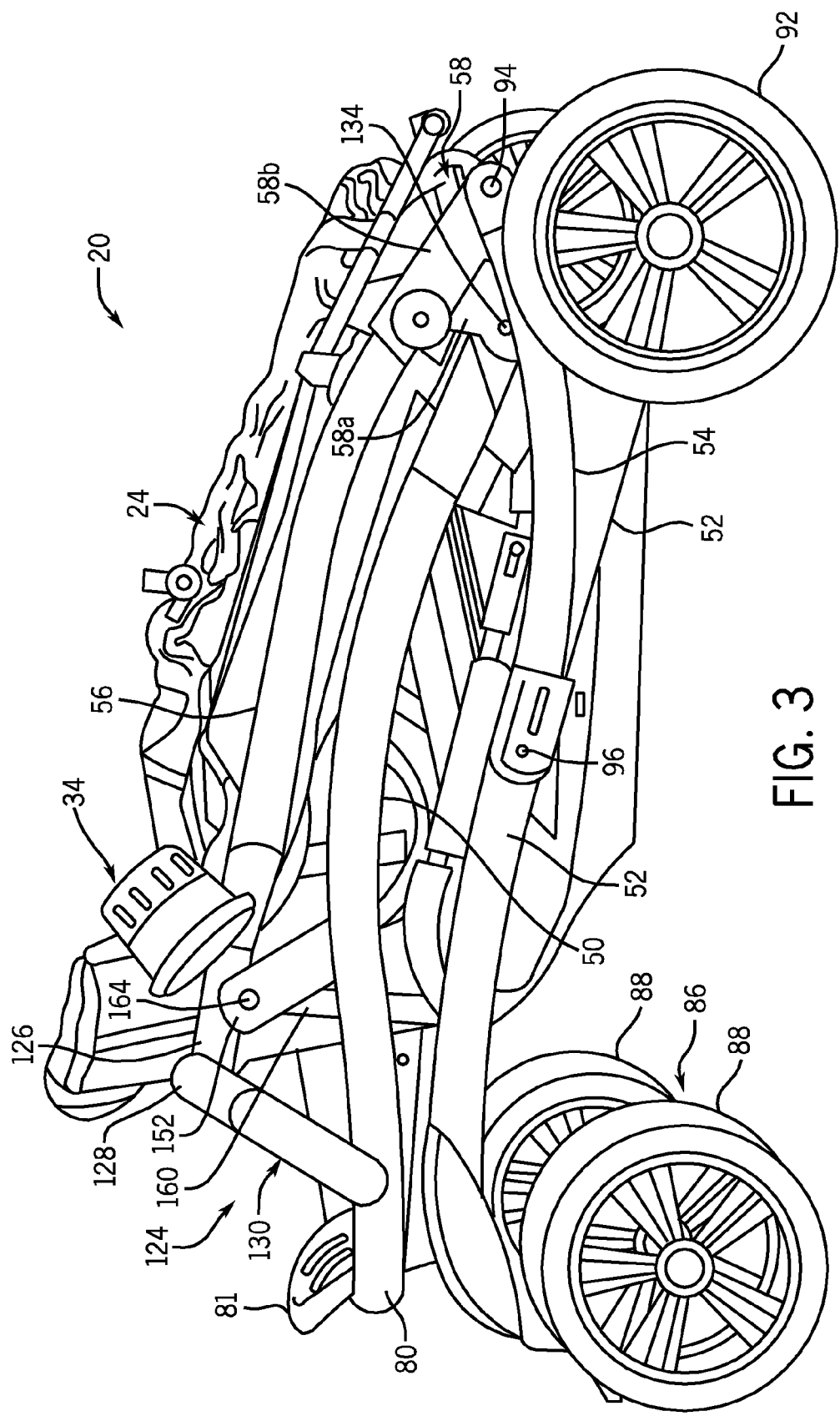
FIG. 3 is a side view of the stroller in FIG. 1 and in a completely folded configuration.

Referring to FIGS. 1-3, each fold latch 58 also has an upper part 58b that is coupled to a respective one of the front leg upper ends 60. The two latch parts 58a, 58b of each fold latch 58 are hinged or pivoted together by a rivet, pin, fastener, or the like at a pivot axis or point 134 on each side of the stroller. Each stroller frame side, therefore, forms or defines a foldable four-bar linkage arrangement inclusive of the front leg 50, the strut 54, part of the rear leg or bottom rail 52 (between the forward end front leg pivot 84 and the strut pivot point 96), and the lower part 58a of the fold latch 58. The basic frame construction of the stroller 20, though for a single seat stroller, is described and disclosed in commonly owned U.S. Pat. No. 7,188,858, for example, which is also incorporated herein by reference in its entirety.

The overall frame fold geometry is shown in FIGS. 1-3 for the stroller 20. FIG. 1 illustrates the frame geometry in the fully open, in-use position. Folding the stroller 20 is progressively illustrated in FIGS. 2 and 3. First, a user rotates the actuator 132 to release the latches 58. When the fold latches 58 are released, the handle assembly 124 and push arms 56 are rotated upward and forward about the latch pivots 134, and then downward and forward toward the front legs 50 and bottom rails 52 as depicted in FIG. 2. The top ends 62 of the support struts 54 simultaneously rotate to the rear with pivoting motion of the lower latch part 58a. The front legs 50 also rotate about the pivots 84 and the upper ends 60 drop downward toward the bottom rails 52. This motion allows the frame to collapse as in FIG. 3 all the way to a folded position. When folded, the front legs 50 nest with or lie closely adjacent the bottom rails 52 and the push arms 56 nest with or lie closely adjacent the front legs. The struts 54 fold rearward and curve upward and fit within the collapsed vertical height between the legs 50, push arms 56, and bottom rails 52. In this folded configuration, the upper crossbar 120 and the handle assembly 124 are positioned near the front seat 22 and the front wheel assemblies 86. The basket frame 100 drops between the front legs 50 and bottom rails 52.

Generally, folding of the stroller 20 is simple and easy because the entire stroller drops to the ground without the user having to control the weight of the stroller as it folds. Folding is accomplished with all four wheel locations on the ground. Unlike some prior art strollers, the seat 10 in the present stroller does not make contact with the ground as the stroller is folded. The rear seat in this type of stroller is typically a fabric sling seat suspended between the frame sides. In this example, the rear seat 24 is suspended from the push arms 56 and cross-tube 120 and collapses or folds along with these components over the top of the front seat 22. The front seat in this type of stroller can also be a sling-type seat or can have a generally rigid, fabric covered seat back 136 and seat bottom 138. These components can be configured to pivot or rotate during folding of the stroller to an appropriate orientation and position within and between the frame side components.

Referring to FIG. 4, a front frame portion of the stroller 20 is shown with other components removed. The front legs 50, the bottom rails 52, the lower cross-tube 80, and the brackets 82 are depicted in this figure. A portion of the front seat 22 is also shown. In this example, the fabric cover of the seat bottom 138 has been removed exposing a seat pan 150 that supports the seat occupant during use. The seat pan 150 is coupled to the stroller frame by a seat linkage that includes a depending link 152 positioned on each side of the seat pan 150. In the disclosed example, an armrest 36, including a cup holder 32, is carried at an upper end of each of the links 152 and extends forward therefrom on opposite sides of the seat pan 150. Each depending link is coupled at a pivot connection 158 located generally at its midpoint to the inner side of a respective one of the front legs 50 and can rotate about the connection 158 relative to the front legs.

A link arm 160 is positioned on each side of the seat pan 150 and has one end pivotally connected at a pivot point 162 to an inside of this respective bottom rail 52. An opposite end of each link arm 160 is pivotally connected at the pivot joint 164 to a lower end 166 of a respective one of the depending links 152. As the front legs 50 move downward toward of the bottom rails 52 during folding, the seat linkage changes the orientation of the seat pan 150, as described below.

FIG. 5 illustrates a plan view of a rear portion of the push arms 56, the push arm crossbar 120, and the handle assembly 124. In this example, a first latch part or catch 170 protrudes outward from the crossbar 120 toward the handle bar 128 and in this example is located centrally between the left and right frame sides. The disclosed catch 170 is integrally formed as a molded protrusion on a layer of plastic, thermoplastic elastomer, or other suitable material that is attached to, adhered to, or co-molded on the rearward or outward facing convex surface of the crossbar 120. In other examples, the catch 170 can be a separate component attached to or assembled with a part of the stroller frame, such as the crossbar 120. In the disclosed example, the catch 170 generally includes a head 172 and the stem 174 that couples the head to the frame part, which in this case is a molded surface on the crossbar 120. The disclosed head 172 is generally an oblong, elongate complement aligned with the crossbar and has a width that is greater than a width of the stem 174. As will become evident to those of ordinary skill in the art upon reading this description, the catch 170 can vary in configuration and construction within the spirit and scope of the invention.

Figure 6:
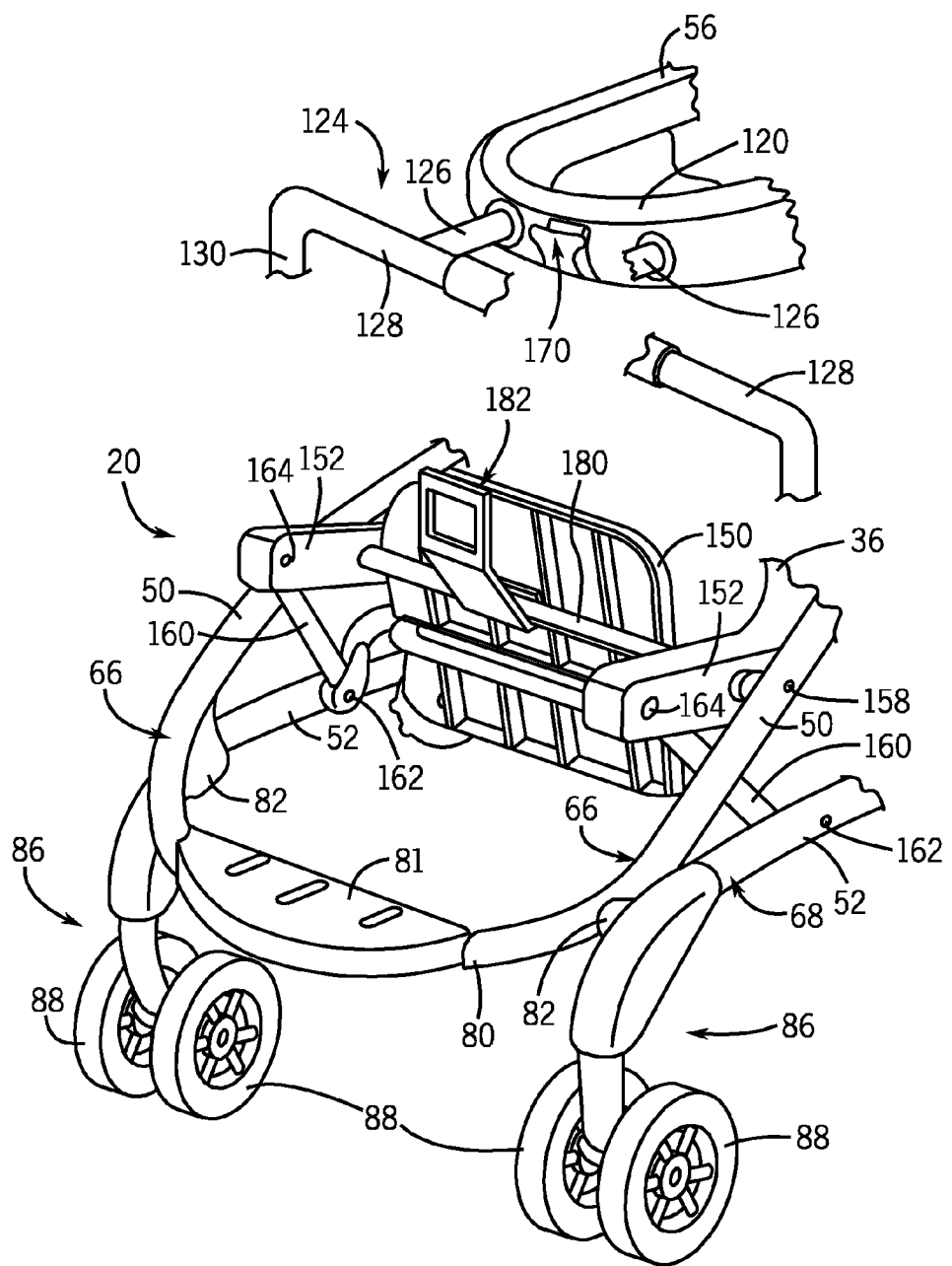
FIG. 6 is a top and front perspective view of the stroller including the frame front portion in FIG. 4 and in a nearly folded position.

FIG. 6 shows the stroller 20 in a mostly folded configuration. As can be seen, the catch 170 has been carried by the handle assembly 124 and the crossbar 120 of the push arms 56 into a position near the seat pan 150. As can also be seen in FIG. 6, a seat crossbar 180 extends laterally between the left and right frame sides and is aligned with the pivot connections 158 of the depending links 152 to the front legs 50. In this example, the seat crossbar 180 is fixed to the front legs 50 and the seat pan 150 is carried on the crossbar 180. Thus, the seat pan 150 and crossbar 180 move in conjunction with the front legs and the seat pan can rotate about the crossbar during folding.

A second latch part or latch strap 182 is also positioned centrally in this example between the left and right frame sides on a frame part. In the disclosed embodiment, the frame part is the seat crossbar 180 and the latch strap 182 is affixed to the crossbar. The latch strap 182 of the disclosed example is formed of a flexible plastic material and has a strap body 184 and an engaging portion 186 in the form of a loop integrally carried on a free end of the strap body. An opening 188 is provided within the loop or engaging portion 186. The opening 188 is sized to fit over the width of the head 172 on the catch 170. The head 172 can pop through the opening 188 and latch. The endmost section 190 of the engaging portion or loop 186 is configured to slide along the catch 170 and then over the head 172 to latch when the stroller is completely folded as shown in FIGS. 3 and 7. In the disclosed example, a proximal end of the strap body 184 is partially wrapped around the seat crossbar 180 and fastened or otherwise attached to the crossbar. Thus, the latch strap 182 will move in conjunction with the crossbar 180 to which it is attached. The combination of the catch 170 and the latch strap 182 form one example of a storage latch constructed in accordance with the teachings of the present invention.

The disclosed storage latch example is intended to automatically latch upon completely folding the stroller 20. As shown in FIGS. 2, 3, and 6-8, the seat pan 150 moves from a generally horizontal orientation when the stroller 20 is in the in-use configuration to a generally a vertical orientation when the stroller is folded. This movement is driven by the seat linkage described above with respect to FIG. 4. The seat pan 150 in this example is configured to nest between the push arms 56 inside of the crossbar 120 when the stroller 20 is folded. Thus, the crossbar 120 and the catch 170 will drop down adjacent the underside of the seat pan 150 and the latch strap 182. The second latch part or strap 182 in this example is a flexible and resilient to hold its shape. The strap is shaped to position the loop or engaging part 186 a distance away from the bottom of the seat pan 150. The gap between the seat pan and the engaging part 186 is sized to receive the crossbar 120 including the catch 170.

As shown in FIGS. 7 and 8, the end most section 190 on the engaging part 186 is positioned to contact and bear against a portion of the catch 170 just prior to latching. A latch strap 182 or strap includes flexibility in the body 184, the engaging portion 186, or both. The flexibility and resiliency in the latch strap 182 allows the part to forcibly bear against the catch 170 and yet complete the latching procedure. As the end most section 190 clears the head 172 on the catch 170, the resiliency in the latch strap 182 will force the end most section into an engage position with the catch part.

Figure 9:
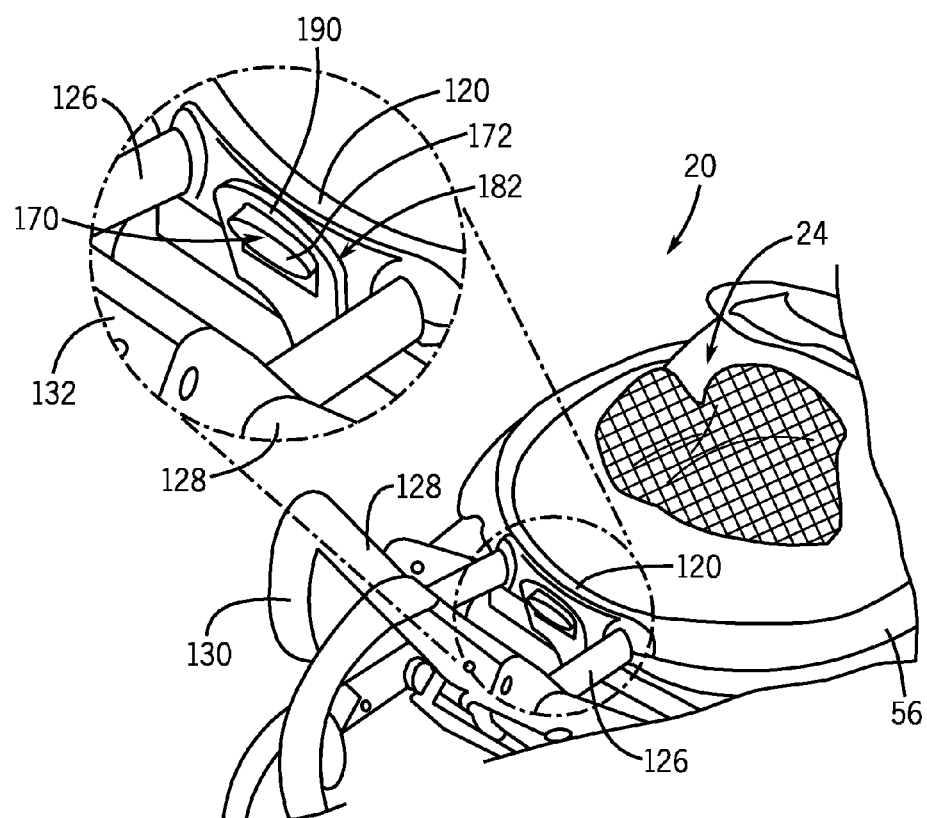
FIG. 9 is an enlarged top perspective view of the stroller latch in a completely latched position.

As shown in FIGS. 8 and 9, the stem 174 on the catch 170 can include a groove or recess 192 that is positioned between the head 172 and a surface on the crossbar 120. In the folded configuration, the recess 192 faces upward. With the stroller 20 in the in-use configuration, the recess 192 would face downward. The recess 192 is created by a surface on the stem in this example that is angled or undercut inward toward the stem 174 in a direction from the head 172 to the crossbar 120 as depicted in FIG. 9. The surface on the stem 174 that is opposite the recess 192 faces downward in the folded configuration and upward in the in-use frame configuration. This surface is configured to create a cam or ramp surface 194 providing a smooth transition from a front or exposed face of the head 172 to the downward facing (in the folded configuration) edge 196 of the crossbar 120. In the disclosed example, the surface 194 on the stem is smooth and generally has two slightly non-parallel surfaces. In another example, the surface 194 could be completely flat or curved concavely or convexly. The surface 194 allows the end most section 190 of the engaging part 186 to slide along the surface without obstruction in order to latch. As shown in FIG. 9, the end most section 190 snaps over the head 172 and nests or registers within the recess 192 (FIG. 8) when latched. The surface 194 on the stem can vary in configuration and yet create a ramp or cam surface for the storage latch.

The positioning of the catch 170 and latch strap 182 can be designed to engage and latch when the handle assembly or push arms on the collapsed or folded frame assembly are pushed forcibly downward slightly beyond a natural resting folded shape. The frame assembly will then force the push arms and handle assembly slightly upward drawing the end most section 190 in to the recess 192 to assist in retaining the storage latch in the latched configuration of FIG. 9. In order for a user to release the storage latch, the user can again push down on the handle assembly or another part of the stroller 20, grasp the latch strap 182, and remove the engaging portion 186 from the catch part 170.

In the in-use configuration, the disclosed latch strap 182 of the storage latch is stowed or hidden under the seat pan 150. Thus, when the stroller 20 is in normal use, the loop or engaging portion 186 and strap 184 are essentially unseen and will not detract from the appearance of the stroller. As the seat pan 150 moves and rotates about the seat crossbar 180 during folding, the latch strap 182 is revealed and becomes exposed for latching.

The loop or engaging portion 186 and the latch strap 182 can vary and yet fall within the spirit and scope of the invention. For example, the latch strap 182 can alternatively include a ring, hoop, hook, catch, or the like in place of the loop. Additionally, the seat crossbar 180 and seat linkage arrangement can also vary considerably and yet fall within the spirit and scope of the present invention. Both storage latch parts 170 and 182 can be placed on different frame components from that shown and described herein and yet function as intended. Also, the latch part can be configured to be a flexible plastic lever, boss, or other part rigidly connected to a part of the stroller, similar to conventional latches, but positioned on a transverse or side-to-side extending frame part of the stroller. The catch 170 and latch strap 182 can also be can be reversed in that the catch can be near the seat pan and the latch strap can be near the handle. Also, the size, shape, and configuration of the catch part 170 can also be altered or replaced by other mechanical connection parts suited to engage or couple with another centrally mounted latch part on the stroller.

It is also conceivable that one having ordinary skill in the art, upon reading this disclosure, will recognize that the storage latch can be located on a transverse extending frame part between the frame sides and yet not automatically latch upon folding the frame. A floppy strap could be utilized in place of the resiliently flexible latch strap 182 and be manually looped onto the catch. Automatic latching is preferable within the spirit and scope of the present invention, but manual latching is possible. It is also conceivable that one or more storage latches can be mounted on the stroller on transverse frame parts and yet not be mounted centrally or at a mid-point on those parts. Additionally, latch action in the disclosed example takes place with the latch strap 182 bending and moving in a lengthwise or longitudinal direction relative to the stroller. It is further conceivable within the spirit and scope of the present invention to provide one or more storage latches wherein the latching action of the parts or components can alternatively take place in a side-to-side direction when latching.

Although one particular type of stroller and frame construction is disclosed and described herein, the disclosed storage latch can be utilized on many different stroller and frame configurations and arrangements. There are many different types of stroller frames and fold configurations. It is conceivable that one of ordinary skill in the art upon reviewing this disclosure could employ a storage latch on transverse frame parts of other types of foldable stroller frames. It is preferable, though not necessary, that the latch parts be readily accessible to release the stroller frame from the folded and latched configuration. The disclosed storage latch is readily accessible. As noted above, the construction and arrangement of the particular parts of the disclosed storage latch can also vary considerably, as long as the parts are generally centrally located between the left and right stroller frame sides. In the disclosed example, the storage latch is positioned central to the frame of the stroller with one latch part carried on one traversing frame part and the other latch part carried on a different traversing frame part. Thus, the frame joints and parts are not subjected to undue torque or stress when latched and carried. However, as noted above, the storage latch components can be mounted off-set from a lateral mid-point of the stroller frame. The stroller frame need not even have a symmetrical frame construction from side-to-side, though most strollers are side-to-side symmetrical.

Although not necessary, it may also be preferable to have the latch parts either hidden from view when the stroller is in the in-use configuration, or configure the latch components to be aesthetically and/or physically unobtrusive in the stroller frame in-use configuration. Also, the disclosed storage latch automatically latches as the stroller is folded and is also substantially hidden from view during normal use of the stroller. The disclosed catch part 170 can employ a manufacturer's appliqué and/or be configured to support or suspend a hand bag, shopping bag, or the like during periods of stroller use.

Although one example of a foldable stroller storage latch has been disclosed and described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A storage latch for a foldable stroller having a frame assembly and a seat bottom that can be moved from an in-use configuration to a folded configuration, the storage latch comprising:
   a catch part carried on a first frame part that extends transversely between left and right frame sides;
   a latch part carried on a second frame part that extends transversely between the left and right frame sides, the latch part positioned directly beneath an underside of the seat bottom and moving from a stowed position to a latching position adjacent the catch part as the frame assembly and the seat bottom are moved to the folded configuration,
   wherein the latch part is a flexible strap affixed to a frame crossbar positioned beneath a stroller seat.

2. A storage latch according to claim 1, wherein the latch part extends radially outward from the second frame part beneath the seat bottom.

3. A storage latch according to claim 1, wherein the latch part is wrapped at least partially around the frame crossbar.

4. A storage latch according to claim 3, wherein the catch part projects from a frame crossbar positioned near a handle assembly, and wherein the handle assembly pivots forward and downward toward the stroller seat and the stroller seat pivots rearward exposing and raising the latch part to engage the catch part when the frame assembly is moved to the folded configuration.

5. A storage latch according to claim 1, wherein the catch part and the latch part are each carried centrally on the respective first and second frame parts between the left and right frame sides.

6. A storage latch according to claim 1, wherein the latch part automatically engages the catch part when the frame assembly is reconfigured to the folded configuration and retains the frame assembly in the folded configuration.

7. A stroller comprising:
   a frame assembly reconfigurable between an in-use configuration and a folded configuration, the frame assembly having left and right frame sides spaced apart from one another;
   a first frame part positioned and extending transversely between the left and right frame sides;
   a first latch part carried on the first frame part between the left and right frame sides;
   a stroller seat supported by the frame assembly and having a seat bottom;
   a second frame part positioned beneath the seat bottom and extending transversely between the left and right frame sides;
   a second latch part carried on the second frame part between the left and right frame sides and positioned directly beneath an underside of the seat bottom,
   wherein the first and second latch parts can engage one another when the frame assembly is reconfigured to the folded configuration to retain the frame assembly in the folded configuration, and
   wherein the first frame part is a crossbar extending between a pair of push arms, one on each of the left and right frame sides.

8. A stroller according to claim 7, wherein the second frame part is a crossbar positioned between the left and right frame sides and rotatable with the stroller seat.

9. A stroller according to claim 8, wherein the second latch part rotates with the crossbar.

10. A stroller according to claim 7, wherein the crossbar and the pair of push arms pivot forward and downward toward a front end of the frame assembly when moved to the folded configuration.

11. A stroller according to claim 7, wherein the first latch part is a catch that projects from the crossbar.

12. A stroller according to claim 11, wherein the second latch part is a flexible strap with a distal end configured to engage the catch.

13. A stroller according to claim 7, wherein the first latch part moves relative to the second latch part in a longitudinal direction relative to the frame assembly when engaging the second latch part.

14. A stroller according to claim 7, wherein the second latch part is a flexible strap having a loop on a free end configured to catch on a portion of the first latch part.

15. A stroller according to claim 7, wherein the seat bottom pivots from a generally horizontal position in the in-use configuration to a generally vertical position in the folded configuration, and wherein the second latch part moves in conjunction with the seat bottom.

16. A stroller according to claim 7, wherein the first and second latch parts automatically engage one another when the frame assembly is reconfigured to the folded configuration and retain the frame assembly in the folded configuration until the first and second latch parts are manually disengaged.

17. A stroller according to claim 7, wherein the first and second latch parts are each carried centrally on the respective first and second frame parts between the left and right frame sides.

18. A stroller comprising:
   a frame assembly reconfigurable between an in-use configuration and a folded configuration, the frame assembly having left and right frame sides spaced apart from one another;
   a first frame part positioned and extending transversely between the left and right frame sides;
   a first latch part carried on the first frame part between the left and right frame sides;
   a stroller seat supported by the frame assembly and having a seat bottom;
   a second frame part positioned beneath the seat bottom and extending transversely between the left and right frame sides;
   a second latch part carried on the second frame part between the left and right frame sides and positioned directly beneath an underside of the seat bottom,
   wherein the first and second latch parts can engage one another when the frame assembly is reconfigured to the folded configuration to retain the frame assembly in the folded configuration, and
   wherein the second latch part is a flexible strap having a loop on a free end configured to catch on a portion of the first latch part.

* * * * *